United States Patent [19]

Bauer et al.

[11] Patent Number: 4,762,366
[45] Date of Patent: Aug. 9, 1988

[54] SELF-LOCKING REVOLUTE JOINT, ADJUSTABLE STEP BY STEP TO AN ANGLE BY MEANS OF PUMPING MOVEMENTS OF AN ACTIVATION LEVER

[75] Inventors: Heinz Bauer; Burckhard Becker; Ernst-Reiner Frohnhaus; Alfred Gedig, all of Solingen; Josef Klink, Nagold; Antonin Koucky, Sindelfingen, all of Fed. Rep. of Germany

[73] Assignees: C. Rob. Hammerstein GmbH; Daimler-Benz AG, both of Fed. Rep. of Germany

[21] Appl. No.: 50,288

[22] Filed: May 14, 1987

[30] Foreign Application Priority Data

May 14, 1986 [DE] Fed. Rep. of Germany ....... 3616164

[51] Int. Cl.⁴ .............................................. B60N 1/02
[52] U.S. Cl. .................................... 297/367; 297/355
[58] Field of Search ............... 297/367, 368, 369, 361, 297/355; 74/130, 144, 29, 76, 89.18, 89.19

[56] References Cited

U.S. PATENT DOCUMENTS 4,685,736  8/1987  Tanaka et al. ...................... 297/367

FOREIGN PATENT DOCUMENTS 2605522  8/1977  Fed. Rep. of Germany ...... 297/367
2931915  2/1981  Fed. Rep. of Germany ...... 297/367
1376806  9/1964  France ................................ 297/367

Primary Examiner—James T. McCall
Attorney, Agent, or Firm—Steele, Gould & Fried

[57] ABSTRACT

The self-locking revolute joint which can be step by step adjustable to an angle by means of pumping movements of an activation lever is particularly suitable for adjustment of seat height or backrest inclination of vehicle seats. It has a mount in which a bearing shaft is journalled. Further, it has a locking disk with notches arranged at equal angular intervals and with a torsion-proof connection with the bearing shaft; further a locking element which is preferably journalled with turning capability at the mount, also having a locking tooth confunctioning with the notches and being elastically prestressed in the engagement direction of this locking tooth and having a total of two control profiles, each one of which has a release profile and an unblocking indentation, the distance between which corresponds to the angular intervals between the notches, and confunctioning with carriers, which can be adjusted by means of the activating lever. Thereby, a return spring is assigned to the activation lever, prestressing the latter into the central position.

The activation lever has a rigid connection with an activation plate, which is journalled to turn freely with the bearing shaft. On the activation plate, around a linkage axle, a release segment is linked so that it can be freely turned, having two carriers arranged symmetrically to the line connecting the linkage axle and the axis of the bearing shaft, being prestressed by means of a return spring into a neutral position, in which both carriers are disengaged from the notches and these carriers are arranged so that after a turning away from the neutral position, one of the carriers engages in one notch, while the other impacts on the adjacent release profile of the locking element and unlocks it.

8 Claims, 2 Drawing Sheets

SELF-LOCKING REVOLUTE JOINT, ADJUSTABLE STEP BY STEP TO AN ANGLE BY MEANS OF PUMPING MOVEMENTS OF AN ACTIVATION LEVER

BACKGROUND

The invention refers to a self-locking revolute joint, which can be adjusted step by step to an angle by means of pumping movements of an activation lever and is particularly suitable for adjustment of seat height or backrest inclination of vehicle seats. The joint cooperates with a mount, in which a bearing shaft is arranged; with a locking disk, rotatably connected with that arm of the joint which is to be adjusted, having notches at equal angular distances and capable of being rotated around the axle of the bearing shaft; and with a locking element which is movably held onto the mount, particularly rotatably in bearings, having a locking tooth cofunctioning with the notches, being elastically prestressed in the engagement direction of the locking tooth in the direction of one of the notches and having a total of two steering profiles cofunctioning with carriers adjustable by means of the activation lever, each of these having one release profile and one unblocking indentation, the distances of which are adjusted to the angle distance of the notches, whereby a return spring is assigned to the activation lever, prestressing the latter into the central position.

In this adjustment device known from the German Disclosure Document DE-OS No. 34 09 144, the adjustment of the bearing shaft in relation to the mount is achieved by means of turning back and forth, i.e. by pumping movements of the activation lever. The movements are similar to those of a ratchet screwdriver. Thereby, the drive forces are limited to a small angular range of e.g. 15° and can thus be utilized in a space-saving and favorable manner, so that the adjustment device initially mentioned is particularly suitable for revolute joitns to be manually activated.

Normally, the activation lever is in its central position, in which it is held by means of the return spring. In this position, the activation lever does not influence the movements of the locking element, which thus remains in the blocking position due to the elastic force of a spring working on the locking element; the locking element assumes this blocking position independently.

The activation lever may be relatively long, whereby one achieves a great and favorable translation of the adjustment forces, preferably initiated manually. Preferably, it is also bent in a manner that allows a good grip, so that the conditions are ergometrically favorable for the user. In the previously known revolute joint, the activation lever is in two parts; it consists of a coupled rocker which is somewhat longer than the radius of the locking disk, and an actual grip lever. The two parts have a linked interconnection and are held in the extended position by means of a spring. The carriers are arranged on the grip lever proper, the described link connection between the grip lever and the coupled rocker is located in the vicinity of the line connecting the two carriers.

OBJECTS AND SUMMARY OF THE INVENTIONS

On the basis of this previously known self-locking revolute joint, the purpose of the present invention is to avoid the disadvantages of this revolute joint and to develop it further so that it tends to clatter less in actual driving, to make a noticeably improved initiation of the adjustment forces by the driver possible, and to increase the efficiency.

On the basis of the revolute joint mentioned initially, this problem has been solved thereby with an activation lever that has a rigid rotation connection with an activation plate and preferably also with the bearing shaft; and with a release segment, freely turning around a linkage axle, linked to the activation plate, having two carriers located symmetrically with the connecting line between the linkage axle and the axle of the bearing shaft and capable of swinging into the notch, the release segment being prestressed in a neutral position by means of a return spring, in which in a neutral position both carriers are disengaged from the notches and these carriers are arranged in such a manner that after a turn out of the neutral position, one carrier engages in one notch, while the other is in contact with the adjacent release profile of the locking element and unlocks the latter.

Thus, the activation lever is directly journalled to the bearing shaft whereby on one hand, acceleration forces affecting the activation lever during driving are intercepted in a favorable manner and clattering as well as vibrations of the activation lever can be better controlled, and, on the other hand, the user will feel a defined turning axis when turning the activation lever back and forth, so that the movements activating the force occur on a precise, predetermined path, in this case a circular path.

By means of the release segment linked, with turning capability, to the activation plate of the activation lever, the driving forces are introduced almost tangentially into the locking disk, i.e. that the basically radial profiles of the notch are almost orthogonally stressed. This decreases those components of the manually initiated adjustment force which fall on the bearing shaft.

The activation plate makes it possible to be less restricted in the design of the revolute joint. In principle, the activation plate can also be joined in one piece with the activation lever, it may also be executed as relatively narrow, since its only purposes are to provide a bearing for the activation lever, to accommodate the linkage axle of the release segment, and to hold the actual activation lever which can be gripped by the hand and is designed to be easily gripped. With the activation plate, the activation lever can be attached to any desired part of the activation plate.

Preferably, the locking tooth and the two carriers have the same shape, so that they can cofunction without differences with the same notches, and particularly, so that no special notches are required for the locking tooth or for the carriers.

In a preferred further development of the invention, the locking tooth in the locking position is located on the line connecting the linkage axle and the axle of the bearing shaft; the two carriers are an symmetrical flaps to this connecting line. This arrangement has the advantage that adjustment movements in both rotational direction are made with the same geometrical ratios and thus, one rotational direction is not preferred over the other. Further, the design is simplified.

It is also advantageous if that angle, of which the apex is formed by the carrier located in the notch, of which one leg runs from this carrier through the axis of the bearing shaft and the other leg from this carrier through the linkage axle, is always greater than 90°, independently of the relative position of the individual parts. Preferably, this angle should be less than 120°. Based on the indicated angle, the carrier in the engaged position is positively pressed into the notch by the adjustment force affected by the activation lever, and this guarantees safe functioning. This engagement is also supplemented by the return spring of the release segment. In addition, the indicated angle has the advantage that in the return stroke, i.e. in the release of the activation lever which immediately returns to its central position due to the return spring, the carrier in the engaged position is immediately released.

Further, it is advantageous if, in the blocking position of a locking element linked to the mount so that it can be turned, that angle amounts to 90° of which the apex is formed by the engaged locking tooth, of which one leg extends from the locking tooth to the axis of the bearing shaft and of which the other leg extends from the locking tooth to the turning axis. This will safely intercept the forces affecting the locking disk in both directions and preclude an independent movement due to a force involved in the return flow path, e.g. a load on the backrest of a vehicle seat provided with the revolute joint. The abovementioned angle may be approximately 90°, but it must be within the self-locking angle between the materials used.

Finally, in an advantageous execution, the locking element is formed by two identical plates arranged on both sides of the release segment and partially overlapping the latter from the side. Hereby, one achieves a tilt resistant arrangement which is appropriate for containing high locking forces while still facilitating a lightweight execution.

The revolute joint according to the invention has the advantage that is can be made quite small, and particularly flat. It is possible to design the locking disk itself as a toothed wheel which meshes with another toothed wheel, e.g. a toothed arc supporting the adjustable linkage. On the other hand, the locking disk may also have a torsion-proof connection with a pinion, preferably with a smaller diameter, via which the turning movement is transferred to another toothed part.

BRIEF DESCRIPTION OF THE DRAWINGS

In the following, two execution examples of the invention, which should not be regarded as exclusive, will be explained in greater detail and with reference to the drawing, which shows.

DETAILED DESCRIPTION

Figure 4:
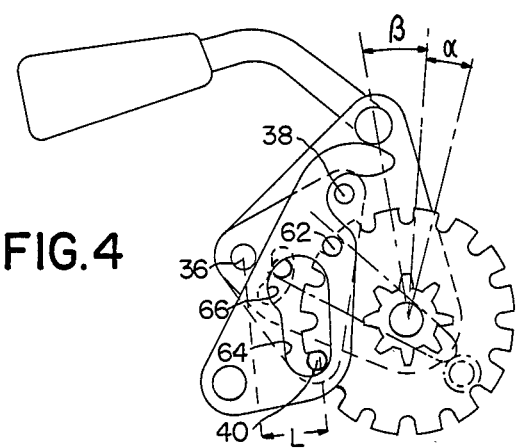

The self-locking revolute joint has an activation lever 20 which can be turned back and forth by pumping movements amounting to the angle beta (see FIG. 4). By means of these pumping movements, the adjustment forces are introduced into the revolute point which can thereby be adjusted step by step with respect to its angle and which always returns by itself to the locking position as soon as the adjustment process is concluded.

Figure 1:
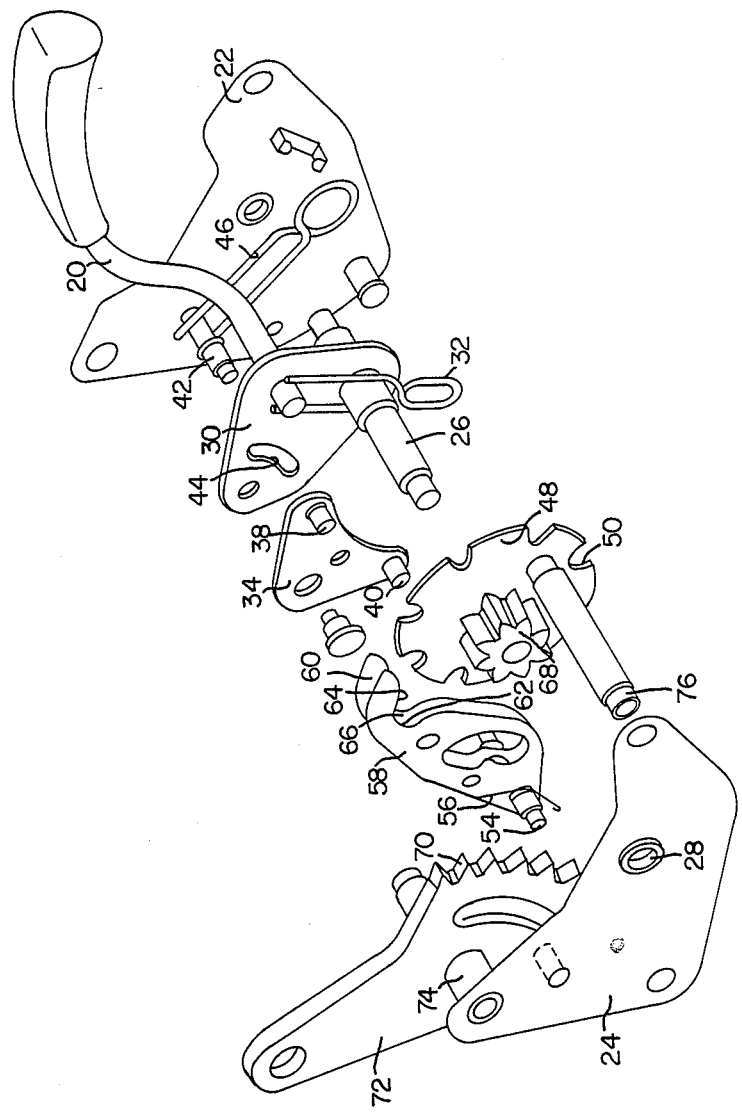
FIG. 1 an assembly picture of a revolute joint.

As FIG. 1 shows, the entire unit is located between two flat, approximately heart-shaped plates 22, 24 of a mount, in which a bearing shaft 26 is journalled so that it turns freely; for this purpose, bearing boxes are provided in both plates, the bearing shaft 26 has tapering adjusted thereto, which simultaneously causes the bearing shaft 26 to be fixed in the axial direction.

The activation lever 26 has a torsion-proof connection with the bearing shaft 26 via an activation plate 30, which is attached in a suitable manner on an additional thickening of the bearing shaft 26. The activation lever 20, which is the actual manual lever and has a grip area, passes through it, so that a counterbearing is formed for the return spring 32, which is basically executed as a hairpin spring, both legs of which rest on the penetrating rod material of the activation lever 20 and also on the bearing shaft 26. A lower loop portion of this return spring 32 surrounds a support bolt located on the rear plate. It ascertains that the activation plate 30 and the activation lever 20 normally assume the central position shown in FIG. 2. It secures both parts against undesirable movements which occur due to accelerations during driving and might cause clattering or a spontaneous adjustment.

A release segment 34 is linked to the approximately triangular activation plate 30 in its left end area (FIG. 1); hereby, the linkage is achieved by means of a bearing bolt which extends through a bearing opening in the release segment 34 and is held in a boring in the activation plate 30, e.g. attached by means of rivets.

The release segment 34 is symmetric and includes flap symmetric parts; it is basically triangular, and carriers 38, 40 developed as round pegs project in the direction opposite to the activation plate. In the opposite direction, a support bolt 42 projects to the vicinity of the rear plate 22. The bolt has a rigid connection with the release segment 34 and passes through an arc-shaped slot 44 in the activation plate 30, whereby the turning movement of the release segment 34 is limited, and thereafter, it rests on the two legs of a return spring 46 for the release segment 34; this spring is also developed as a hairpin spring. This spring also encloses the bearing shaft 26 with both its legs and is also supported by means of matingly configured loop-shaped end portion on the rear plate 22.

In front of the release segment 34 and turning freely on the bearing shaft 26, a locking disk 48 is provided, which has a total of sixteen notches 50 distributed at equal distances. the notches have round bottoms and approximately radial profiles; the free width is slightly greater than the diameter of the carriers 38, 40. They are arranged at equal distances, and their distribution angle generally corresponds to the angle beta, i.e. the adjusting portion of the movement stroke.

At the same axial level as the locking disk 48, there is a locking element 52 which has approximately the shape of the digit "6" and is connected, in its lower area, to a turning axle 54 which is journalled and turns freely in the plates 22, 24. Locking element 52 prestressed in a clockwise direction and towards the locking plate 48 by means of a locking spring 56 supported on the front plate 24. The locking element has two identical side plates 58, 60, which are interconnected at a distance by the turning axle 54 and a locking tooth designed as a bolt, so that their free distance is greater than the thickness of the locking disk 48 and they overlap the latter partially on both sides, as shown particularly in FIGS. 2 through 4.

The locking element 52 has two control profiles, each one consisting of a release profile 64 and an unblocking indentation 66. The latter is located closer to the locking tooth 62 than the release profile 64. The distance between the release profile 64 and the unblocking indentation 66 is always adjusted to the distribution angle in-between the notches 50. As shown particularly in FIGS. 2 through 4, the control profiles 64, 66 are located in the vicinity of one of the carriers 38, 40, and one control profile 64, 66 is assigned to each carier 38, 40. To form the control profiles 64, 66, the upper area of the locking element 52 is designed approximately as a hook; it has an approximately pear-shaped punched hole in its lower area. One carrier 38, 40 engages in each one of the described areas. Thus, the carriers 38, 40 can cofunction with the locking disk 48 without being obstructed by the locking element 52; they control the locking element 52.

Further, a pinion 68 is rigidly connected with the locking disk 48 and meshes with a toothed arc which is developed on an adjustable arm 72. This arm 72 can be turned around an axle 74 which serves simultaneously as a spacing and connection sleeve for the two plates 22, 24. The arm's turning movement is limited by a circular arc slot, into which a peg of the front plate 24 engages. Further, in FIG. 1, one can see an additional spacing sleeve 76, which also serves to connect the two plates 22, 24.

Figure 2:
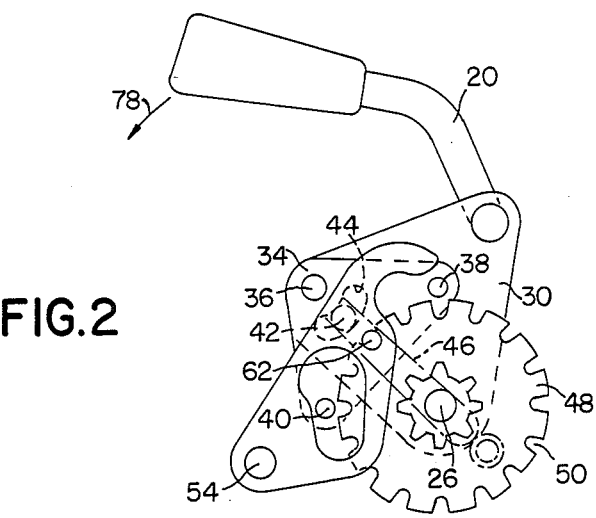
FIG. 2 a top view of a revolute joint similar to FIG. 1; however, for the sake of simplicity, such parts as the mount, pinion, etc. have been eliminated; the locking position is shown.

The function of this rotary adjustment device will be described with reference to FIGS. 2 through 4: FIG. 2 shows the locking position, the locking tooth 62 is engaged in a notch 50 on the locking disk 48, so that its turning movement is blocked. The carriers 38, 40 are outside of the notches arranged in their vicinity, nor do they touch the locking element 52, particularly not the control profiles 64, 66. The activation lever is in its central position.

If the activation lever is turned downwards in the direction of the arrow 78, there is a turning movement around the bearing shaft 26. The linkage axle 36 is turned in the same direction (counterclockwise). Thereby, the support bolt 42 of the release segment 34 is attached to the lower leg of the return spring 46, so that when the turning movement of the activation lever 20 is continued, the release segment is turned in the same direction around the linkage axle 36. By means of this turning movement, the lower carrier 40, which is moving along a circular arc of engagement, arrives into the adjacent notch, whereby a rotation connection between the activation lever 20 and the locking disk 48 is established.

At the same time, the upper carrier 38 turns away from the adjacent notch 50 and impacts on the release profile 64 of the upper control profile 64, 66, it pushes the profile away in a clockwise direction, so that the locking element 52 is turned away from the locking disk 48 around its turning axle 54. Thereby, the locking tooth 62 is disengaged; the locking of the locking plate 48 is cancelled.

Figure 3:
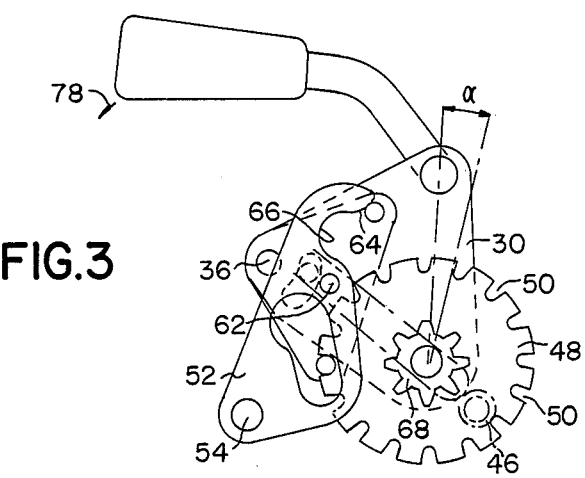
FIG. 3 a view corresponding to FIG. 2, showing that position in which the lower carrier has engaged in and the locking tooth is disengaged from the notch; this position was obtained by turning by the angle alpha, and FIG. 4 a representation corresponding to FIG. 2, showing the conclusion of an adjustment stroke; the adjustment movement is obtained by the angle beta.

This condition is represented in FIG. 3. The turning movement of the activation lever was made over an angle alpha, the locking disk 48 is released, but in a self-locking engagement with the activation lever 20 so that the angular position of the locking disk 48 can now be changed as the adjustment movement of the activation lever 20 continues.

As shown in FIG. 4, the locking disk 48 is turned counterclockwise by one angle unit. When this condition has been reached, the upper carrier 38 has slipped so far towards the upper control profile 64, 66 and towards the turning axle 54 that it has arrived in the area of the unblocking indentation 66. This has been cleared so far towards the rear that the locking element 52 is no longer held by the upper carrier 38 in the unblocked position, rather, under pressure from the locking spring 56 it arrives first at the circular edge of the locking disk and thereafter, after further turning of the locking disk 38, it falls into the next notch; this is shown in FIG. 4.

As soon as the locking position has been achieved again, a further downward turn of the activation lever 20 is blocked, so that the user clearly feels that the adjustment stroke is completed. If he releases the activation lever 20 or brings it upwards (clockwise), the lower carrier 40 slips out of its notch 50 due to the "L" of the lever arm. Subsequently, the two carriers 38, 40 can move freely between the control profiles 64, 66 and the outer edge of the locking disk 48; they assume their positions shown in FIG. 2 again. This concludes the movement stroke; a second movement stroke may follow. A complete rotation of the locking disk is achieved with sixteen strokes. If the activation lever is pulled upwards in the direction opposite to the arrow 78, the leading carrier which is in the turning direction, which engages in a notch 50, will then be the upper carrier 38, while the lower carrier 40 serves to turn the locking element 52 into the inactive position (see FIG. 3).

What is claimed is:

1. A self-locking revolute joint, adjustable step by step to an angle by means of pumping movements of an activation lever, particularly for adjustment of seat height or backrest inclination of vehicle seats, comprising:

a mount, in which a bearing shaft is arranged, a locking means with rotational connection with that arm of the joint which is to be adjusted, having notches distributed at equal angular intervals, and capable of rotating around the axis of the bearing shaft, and a locking element which is held, movable, on the mount so that it can move in bearings, having a locking tooth cofunctioning with the notches, elastically prestressed in the engagement direction of the locking tooth in the direction of one of the notches and having a total of two control profiles, cofunctioning with carriers which are adjustable by means of an activation lever and each one having a release profile and an unblocking indentation, the distance between these being adjusted to the angular intervals of the notches, whereby a return spring means activates a lever and prestresses the latter into a central position, said activation lever having a rigid connection with an activation plate and preferably also with a bearing shaft, that a release segment is linked to the activation plate around a linkage axle so that it can be freely turned, having two carriers which can be turned into the notches, and which is prestressed into a neutral position by means of a return spring in which position both carriers are released from the engagement with notches and these carriers are arranged so that after the turning away from the neutral position, one carrier engages in one notch, while the other carrier rests on the adjacent release profile of the locking element and unblocks it.

2. A revolute joint according to claim 1, wherein a support belt extends sideways from the release segment, whereby the legs of the return spring rest on both sides of said bolt and that said support bolt penetrates an arc-shaped slot in the activation plate.

3. The revolute joint according to claim 1, wherein a locking tooth is located on the line connecting the linkage axle with the axis of the bearing shaft.

4. A revolute joint according to claim 1, wherein the angle of which the apex is formed by the carrier in an engaged position of which one leg runs from this carrier through the axis of the bearing shaft and of which the other leg runs from the carrier through the linkage axle is always, independently of the relative position of the parts, greater than 90°.

5. A revolute joint according to claim 4, wherein the locking position of a locking element linked around a turning axle on a mount, that angle of which the apex is formed by the locking tooth in its engaged position, of which one leg extends from the locking tooth to the axis of the bearing shaft, and of which the other leg extends from the locking tooth to the turning axle, is a right angle and deviates less from 90° that the self-locking angle of the materials used.

6. A revolute joint according to claim 1, wherein the locking element is constructed of identical side plates, which are arranged on both sides of the locking disk and partially overlap the latter from the sides.

7. A revolute joint according to claim 1 including a pinion having a torsion-free connection with the locking disk, meshing with the toothed arc of an adjustable arm which is linked around an axle that can be turned at the mount.

8. A revolute joint according to claim 1, one end of said activation lever penetrates the activation plate and that the two legs of the return spring, developed as a hairpin, rest on the sides of the projecting portion formed in this manner.

* * * * *